United States Patent

Yoder et al.

Patent Number: 5,724,903
Date of Patent: Mar. 10, 1998

[54] SEED FIRMING WHEEL SUPPORT

[75] Inventors: Alfred Dean Yoder, Geneseo; Loyd Thomas Hubbard, Jr., Hampton, both of Ill.

[73] Assignee: Deere & Company, Moline, Ill.

[21] Appl. No.: 731,473

[22] Filed: Oct. 16, 1996

[51] Int. Cl.⁶ ..................... A01C 5/06
[52] U.S. Cl. ............. 111/194; 172/265; 172/269; 172/710
[58] Field of Search ............. 111/189, 194, 111/164, 136, 143, 190, 195, 196; 172/265, 264, 269, 705, 710

[56] References Cited

U.S. PATENT DOCUMENTS

| | | | |
|---|---|---|---|
| 2,961,981 | 11/1960 | Sooter | 111/189 |
| 2,963,998 | 12/1960 | Bliss | 111/189 |
| 3,841,244 | 10/1974 | Tye | 111/189 X |
| 4,009,668 | 3/1977 | Brass et al. . | |
| 4,051,792 | 10/1977 | Brandt, Jr. et al. | 111/189 X |
| 4,148,267 | 4/1979 | Bennett et al. | 111/189 |
| 4,244,306 | 1/1981 | Peterson et al. | 111/189 X |
| 4,307,674 | 12/1981 | Jennings et al. . | |
| 4,432,292 | 2/1984 | Scott | 111/189 X |
| 5,163,518 | 11/1992 | Foley . | |
| 5,398,625 | 3/1995 | Johnson et al. | 111/189 |
| 5,595,130 | 1/1997 | Baugher et al. | 111/189 X |

FOREIGN PATENT DOCUMENTS

| | | | |
|---|---|---|---|
| 821861 | 11/1951 | Germany | 111/189 |
| 954020 | 8/1982 | U.S.S.R. | 111/189 |

*Primary Examiner*—Terry Lee Melius
*Assistant Examiner*—Christopher J. Novosad

[57] ABSTRACT

A support for a seed firming wheel of an agricultural planter. The support comprises a forked frame, a C-shaped link pivotally coupled to the forked frame and a spring positioned between the link and forked frame. The forked frame has a seed tube guard portion, two rearwardly extending arms, and a cross member that form a seed tube opening for receiving a seed tube and maintaining it in the center of the seed planting furrow. The forked frame is also provided with a pivot assembly to which the C-shaped link is mounted. The seed firming wheel is rotatively mounted to the C-shaped link.

14 Claims, 3 Drawing Sheets

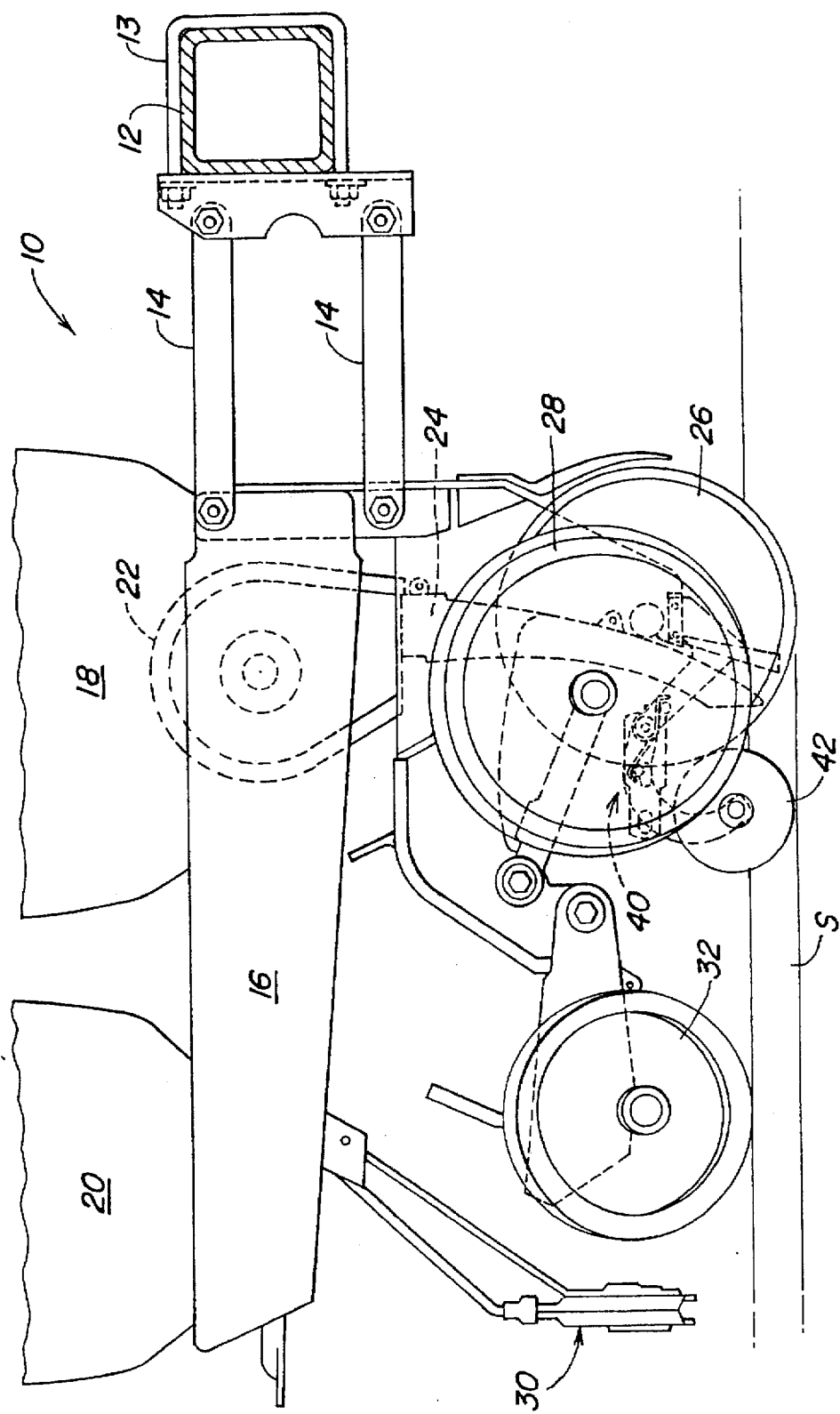

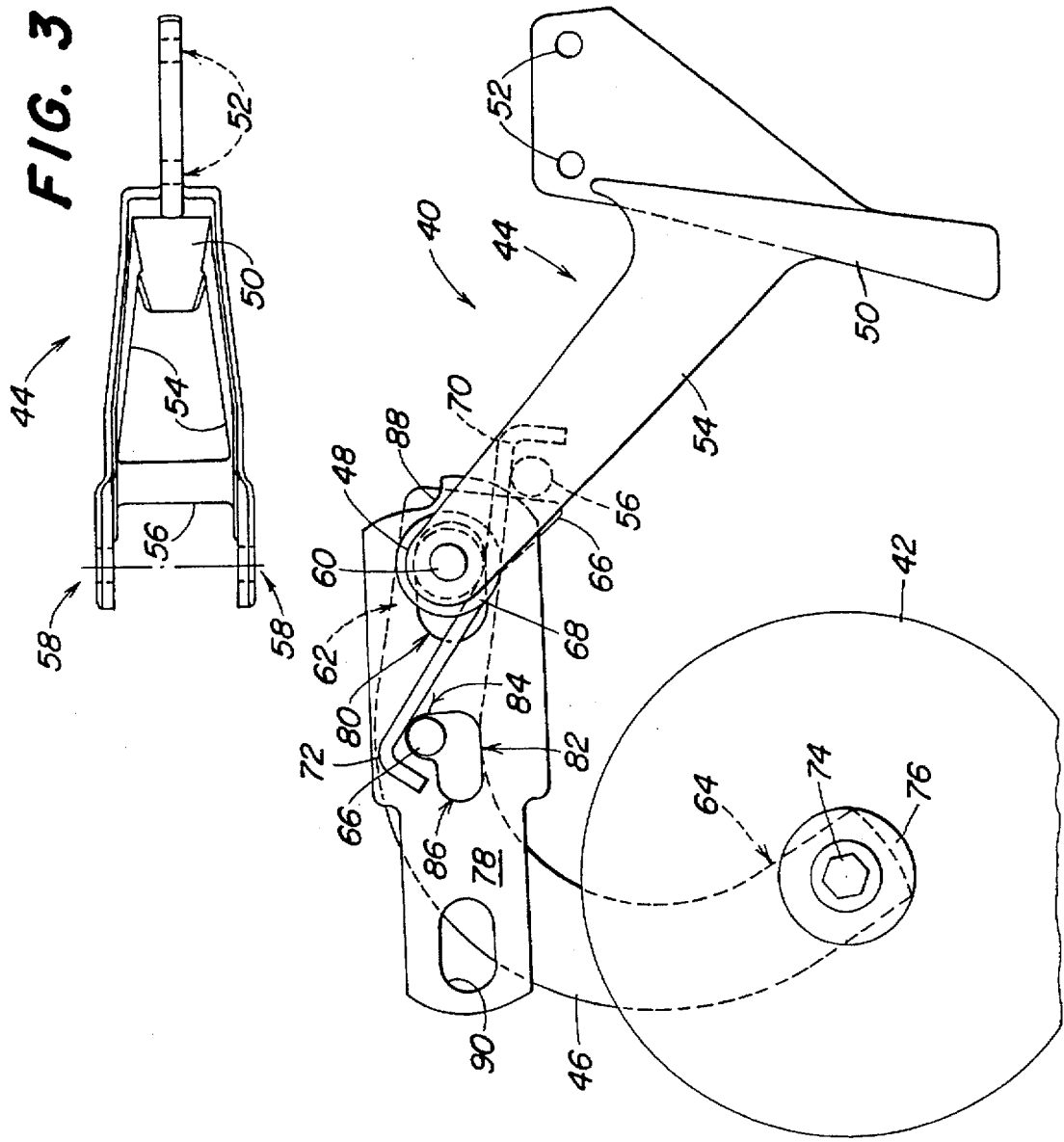

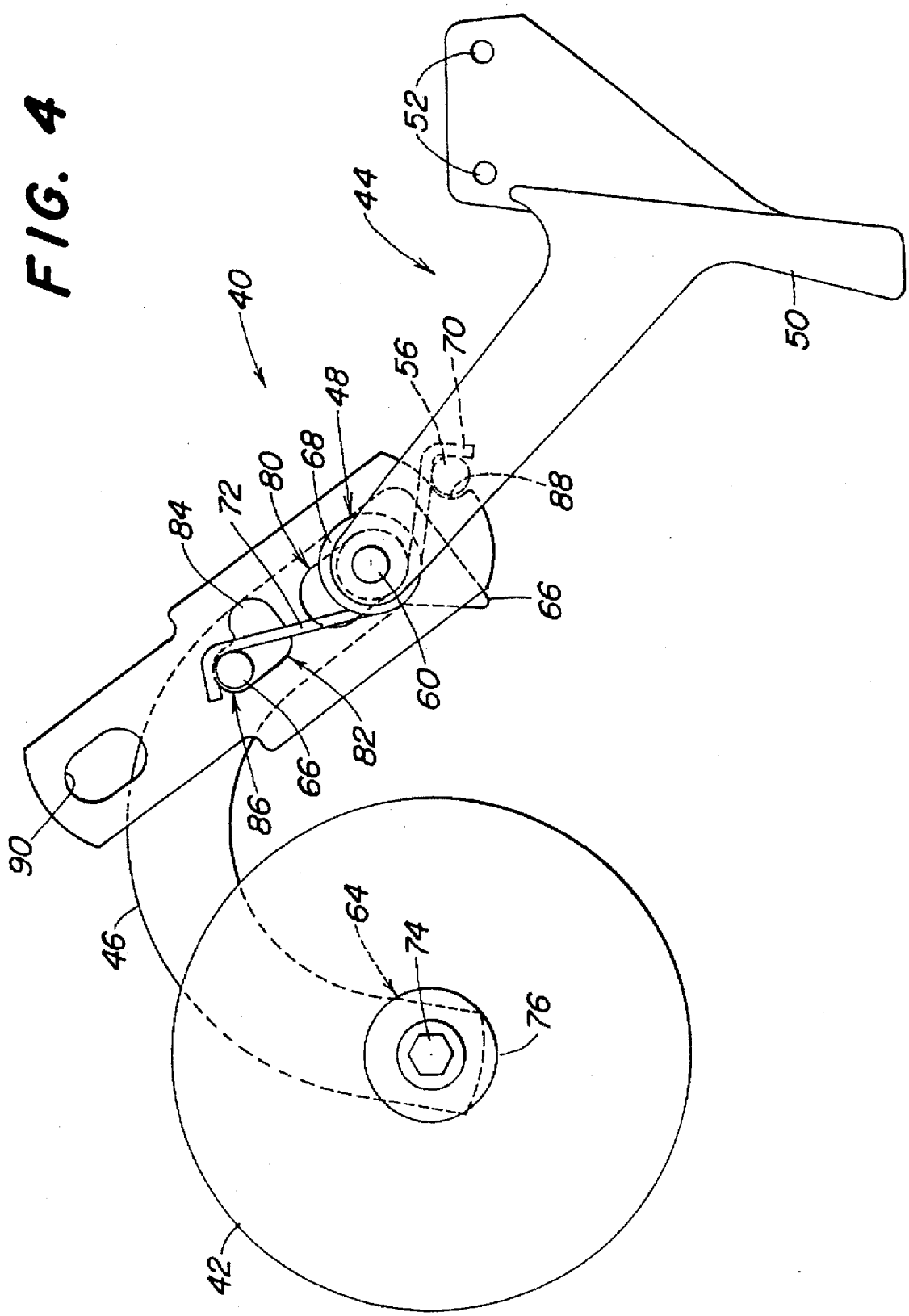

5,724,903

SEED FIRMING WHEEL SUPPORT

BACKGROUND OF THE INVENTION

1. Field of the Invention

The invention is directed to a support assembly for a seed firming wheel having a forked frame for receiving the seed tube of an agricultural planter.

2. Description of the Prior Art

Row crop planters generally comprise a transverse toolbar having a series of rearwardly extending planting units. These units have a frame to which is mounted a furrow opener for forming a seed planting furrow in the seedbed. The furrow opener may be provided with depth control wheels for controlling the depth of the furrow. A seed hopper may be mounted to the frame and direct seed to a seed meter. The seed meter meters the seed and directs the seed through a seed tube to the seed planting furrow formed by the furrow opener.

Following the seed tube are seed firming wheels, press wheels and/or closing wheels. These wheels firm the soil around the seed to obtain good seed-to-soil contact. Seed firming wheels follow the seed tube and run in the seed planting furrow to press seed deposited by the seed tube into the bottom of the seed trench before the seed is covered by closing the furrow. Seed firming wheels may be spring biassed downwardly into contact with the seed trench. Press wheels are used to firm the soil after the seed has been covered by closing the furrow. Closing wheels serve the dual purpose of closing the seed trench and firming the seed bed.

In one planter currently on the market, the furrow opener comprises a double disc assembly. The seed tube is positioned between the double discs. A seed tube guard comprising a metal member is positioned in front of the seed tube between the double discs of the furrow opener. Seed tubes are typically made of plastic. If the seed tube does not stay centered in the seed planting furrow, the tube may wear against the rotating disc blades and the blades may eventually wear a hole in the seed tube.

SUMMARY

It is an object of the present invention to provide a support for a seed firming wheel which also acts as a seed tube guide for maintaining the seed tube centered in the seed planting furrow.

It is a feature of the present invention that the support is provided with a forked frame which forms an opening for the seed tube.

The seed firming wheel support comprises a rearwardly extending forked frame, a C-shaped link pivotally coupled to the forked frame, a biassing spring positioned between the forked frame and the C-shaped link for biassing the C-shaped link downwardly, and a seed firming wheel rotatively mounted to the C-shaped link. The forked frame is provided with a seed guard portion. The seed guard portion is provided with two mounting holes comprising a mounting assembly for mounting the forked frame to a row crop planting unit frame. The forked frame is provided with two arms that extend rearwardly from the seed tube guard portion and which are linked together by a cross member. The seed tube guard portion of the two rearwardly extending arms and the cross member define a seed tube opening though which the seed tube is inserted. The rearwardly extending arms ensure that the seed tube will stay centered in the seed planting furrow. In addition, the seed tube guard portion, the rearwardly extending arms and the cross member are integrally formed.

The rearwardly extending arms of the forked frame extend past the cross member and are provided with two pivot holes for receiving a pivot pin. The C-shaped link has a forward end and a rearward end. The forward end is provided with a pivot hole, whereas the rearward end is provided with an axle hole. The pivot pins extends between the two rearwardly extending arms of the forked frame, passing through the pivot hole of the C-shaped link, pivotally coupling the link to the forked frame. A stop arm extends from the C-shaped link and contacts a stop formed by the cross member of the forked frame to limit the downward movement of the C-shaped link relative to the forked frame. The C-shaped link is also provided with a transversely extending projection.

The spring is positioned between the forked frame and the C-shaped link to bias the seed firming wheel downwardly so that the wheel engages the seed planting furrow. The spring comprises a torsion coil spring that is wrapped about the pivot pin. The torsion spring has two tangentially extending ends. The first end bears against the cross member of the forked frame and the second end bears against the transversely extending projection of the C-shaped link.

A seed firming wheel is rotatively mounted to an axle extending transversely from the axle hole of the C-shaped link. The seed firming wheel is provided with a bearing assembly which engages the axle.

A lockup link can be used to hold the seed firming wheel in either a working or a non-working position. The lockup link is a fore-aft extending link having a fore-aft extending first slot through which the pivot pin extends. The lockup link is provided with a two position L-shaped second slot defining a working position and a non-working position for the seed firming wheel. The transversely extending projection of the C-shaped link extends into this second slot. The lockup link is also provided with a lockup arm which contacts a lockup stop located on the forked frame. The lockup stop comprises the cross member of the forked frame. The lockup link is also provided with a fore-aft extending third slot which can be used as a means of adjusting the link.

BRIEF DESCRIPTION OF THE DRAWINGS

FIG. 1 is a side view of a row crop planting unit having the present invention.

FIG. 2 is an enlarged side view of the present invention in its working position.

FIG. 3 is a top view of the forked frame of the present.

FIG. 4 is an enlarged side view of the present invention in its non-working position.

DETAILED DESCRIPTION

FIG. 1 illustrates a row crop planting unit 10 that is mounted to toolbar 12 by U-bolts 13. Parallel linkage 14 extends between toolbar 12 and the planting unit 10. The frame 16 of the planting unit supports a seed hopper 18 and a granular pesticide hopper 20. Seed in the seed hopper 18 is directed to seed meter 22 which controls the rate of application of the seed. The seed is taken from the seed meter by seed tube 24 and directed to a seed planting furrow S formed by furrow opener 26. Gauge wheels 28 control the depth of the seed trench formed by the furrow opener. The granular pesticide hopper directs dry granular chemical to a chemical meter, not shown, which in turn directs the pesticide to applicator assembly 30. A pair of closing wheels 32 are rotatively mounted to the frame 16. They are located directly behind and on either side of the seed planting furrow. All of the above described elements are relatively conventional.

The subject invention is directed to the configuration of the support 40 for mounting the seed firming wheel 42 the planting unit 10. The seed firming wheel support 40 comprises a rearwardly extending forked frame 44, a C-shaped link 46 pivotally coupled to the forked frame 44, a biassing spring 48 positioned between the forked frame 44 and the C-shaped link 46 for biassing the C-shaped link downwardly, and a seed firming wheel 42 rotatively mounted to the C-shaped link 46.

The forked frame 44 is provided with a seed tube guard portion 50 having mounting holes 52 for mounting the forked frame 44 to the planting unit frame 16. Extending rearwardly from the guard portion 50 are two arms 54. Arms 54 are linked together by a cross member 56. The seed tube guard portion 50, the two rearwardly extending arms 54 and the cross member 56 define a rectangular seed tube opening though which the seed tube 24 is inserted. The rearwardly extending arms 54 ensure that the seed tube 24 will stay centered in the seed planting furrow S. The seed tube guard portion 50, the rearwardly extending arms 54 and the cross member 56 are integrally formed.

The rearwardly extending arms 54 of the forked frame 44 extend past the cross member 56 and are provided with two pivot holes 58 for receiving a pivot pin 60. The C-shaped link 46 has a forward end 62 and a rearward end 64. The forward end 62 is provided with a pivot hole, whereas the rearward 64 end is provided with an axle hole. The pivot pin 60 extends between the two rearwardly extending arms 54 of the forked frame 44, passing through the pivot hole of the C-shaped link 46, pivotally coupling the link to the forked frame 44. A stop arm 66 extends from the C-shaped link 46 and contacts a stop formed by the cross member 56 of the forked frame 44 to limit the downward movement of the C-shaped 46 link relative to the forked frame 44. The C-shaped link 46 is also provided with a transversely extending projection 67.

The spring 48 is positioned between the forked frame 44 and the C-shaped link to bias the seed firming wheel 42 downwardly so that the wheel engages the seed planting furrow S. The spring 48 comprises a torsion coil spring having a helical coil 68 that is wrapped about the pivot pin 60. The torsion spring 48 has two tangentially extending ends 70 and 72, respectively. The first end 70 bears against the cross member 56 of the forked frame 44 and the second end 72 bears against the transversely extending projection 67 of the C-shaped link 46.

The seed firming wheel 42 is rotatively mounted to an axle formed by bolt 74 extending transversely from the axle hole of the C-shaped link 46. The seed firming wheel 42 is provided with a bearing assembly 76 which engages the axle 74.

A lockup link 78 can be used to hold the seed firming wheel 42 in either a working (FIG. 2) or a non-working position (FIG. 4). The lockup link 78 is a fore-aft extending link having a fore-aft extending first slot 80 through which the pivot pin 60 extends. The lockup link 78 is provided with a two-position L-shaped second slot 82 Having a first position 84 defining a working position and a second position 86 defining a non-working position for the seed firming wheel 42. The transversely extending projection 67 of the C-shaped link 46 extends into this second slot 82. The lockup link 78 is also provided with a lockup surface 88 which contacts a lockup stop formed by the cross member 56 of the forked frame 44. The lockup link 78 is also provided with a fore-aft extending third slot 90 which can be used as a means to adjust the lockup link 78.

In moving the seed firming wheel 42 from its working position to its non-working position, the operator first lifts the seed firming wheel relative to the forked frame 44. This can be done by putting a board on the ground placing the seed firming wheel 42 on the board so that the weight of the planting unit 10 compresses the biassing spring and forces the wheel upwardly. The operator then rotates and slides the lockup link 78 forward until lockup surface 88 engages cross member 56 and transverse projection 67 is positioned in the non-working position 86 of the second slot 82.

In moving the seed firming wheel 42 from its non-working position to its working position, the operator again lifts the seed firming wheel 42 relative to the forked frame 44. The operator then pulls the lockup link rearwardly until the transverse projection 67 is inserted into the working position 84 of the second slot 82. The seed firming wheel 42 is released and is placed in its working position.

The invention should not be limited by the above-described embodiment, but should be limited solely by the claims that follow.

We claim:

1. A support for a seed firming wheel of an agricultural planter, the support comprising:

a forked frame having a seed tube guard portion which is provided with a mounting assembly for mounting the forked frame to the agricultural planter, the forked frame being provided with two rearwardly extending arms, the two rearwardly extending arms having a cross member, the forked frame defining a seed tube opening through which the seed tube of the planter is maintained in the center of a seed planting furrow, the forked frame also being provided with a pivot assembly, the pivot assembly having a spring assembly for applying a down pressure to the seed firming wheel;

a link pivotally mounted to the pivot assembly of the forked frame and extends rearwardly from the seed tube opening; and the seed firming wheel being rotatively mounted to the link for firming seeds in a seed planting furrow.

2. The support as defined by claim 1 wherein the seed tube guard portion, the two rearwardly extending arms and the cross member of the forked frame are integral with one another.

3. The support as defined by claim 2 wherein the link is provided with a stop arm that bears against a stop on the forked frame to limit downward movement of the seed firming wheel.

4. The support as defined by claim 3 wherein the link is a C-shaped link having a forward end that is pivotally coupled to the pivot assembly and a rear end having a transversely extending axle to which is mounted the seed firming wheel.

5. The support as defined by claim 4 wherein the stop of the forked frame is formed by the cross member.

6. The support as defined by claim 5 further comprising a lockup link for locking the seed firming wheel into a non-working position.

7. An agricultural planter for applying seeds to a field, the planter comprising:

a frame;

a seed meter mounted to the frame for controlling the rate at which seeds are applied to the field;

a furrow opener mounted to the frame for opening a seed planting furrow to which seeds are applied from the seed meter;

a seed tube extending from the seed meter to the seed planting furrow for directing seeds into the seed planting furrow;

a seed firming wheel located behind the furrow opener in the furrow formed by the furrow opener, the seed firming wheel is provided with a support comprising a forked frame having a seed tube guard portion located in front of the seed tube which is mounted to the frame, the forked frame being provided with two rearwardly extending arms, the two rearwardly extending arms having a cross member, the forked frame defining a seed tube opening through which the seed tube of the planter being inserted and maintained in the center of the seed planting furrow, the forked frame also being provided with a pivot assembly, the pivot assembly having a spring assembly for applying a down pressure to the seed firming wheel, a link pivotally mounted to the pivot assembly of the forked frame and extending rearwardly from the seed tube opening, and the seed firming wheel being rotatively mounted to the link for firming seeds in the seed planting furrow.

8. The agricultural planter as defined by claim 4 the wherein the seed tube guard portion, the two rearwardly extending arms and the cross member of the forked frame are integral with one another.

9. The agricultural planter as defined by claim 8 wherein the link is provided with a stop arm that bears against a stop on the forked frame to limit downward movement of the seed firming wheel.

10. The agricultural planter as defined by claim 9 wherein the link is a C-shaped link having a forward end that is pivotally coupled to the pivot assembly and a rear end having a transversely extending axle to which is mounted the seed firming wheel.

11. The agricultural planter as defined by claim 10 wherein the stop of the forked frame is formed by the cross member.

12. The agricultural planter as defined by claim 11 further comprising a lockup link for locking the seed firming wheel into a non-working position.

13. A forked frame for an agricultural planter, the forked frame comprising:

a seed tube guard portion having a mounting assembly for mounting the forked frame to the agricultural planter;

two arms extending rearwardly from the frame; and a cross member extending between the two arms, such that the seed tube guard portion, the two arms and the cross member define a seed tube opening for receiving a seed tube of the agricultural planter whereby the seed tube guard portion, the two arms and the cross member are integral with one another.

14. The forked frame as defined by claim 13 wherein each arm is provided with a pivot hole for receiving a pivot pin that spans the two arms.

* * * * *